June 10, 1969     J. KASTNER ET AL     3,448,613
SYSTEM FOR TRACKING AIR CURRENTS
Filed Sept. 16, 1966     Sheet 1 of 2
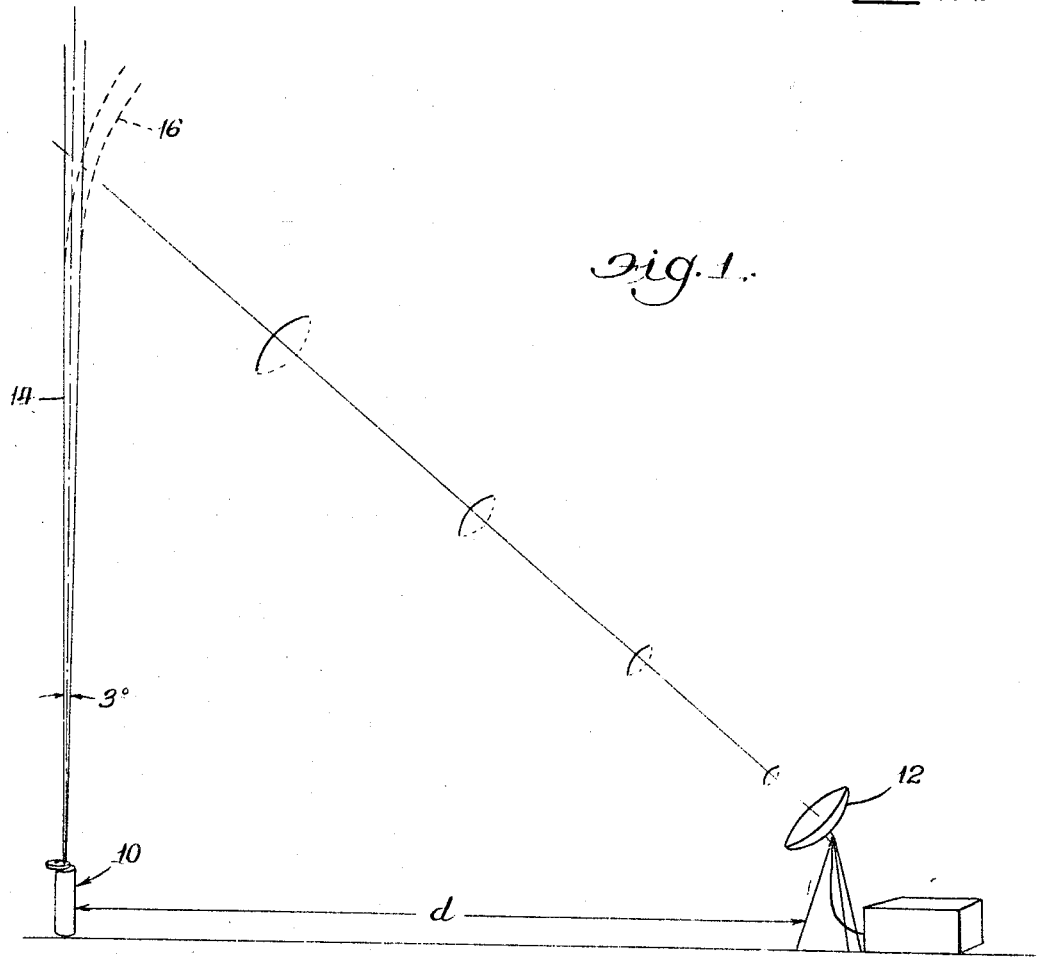
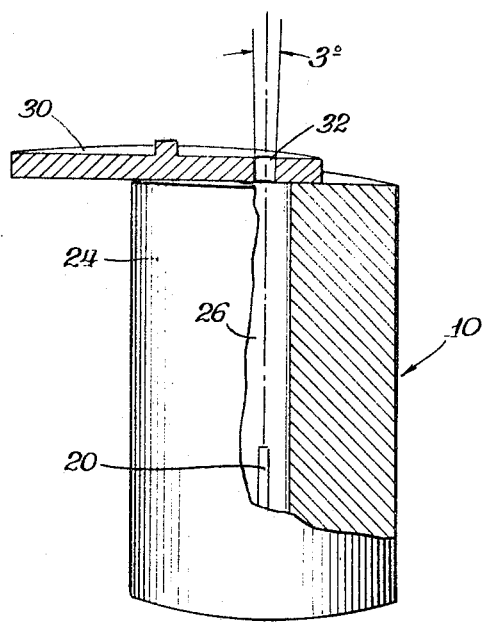
Inventors:
Jacob Kastner
Steven L. Halverson
By Robert L. Slater, Jr.
Atty.

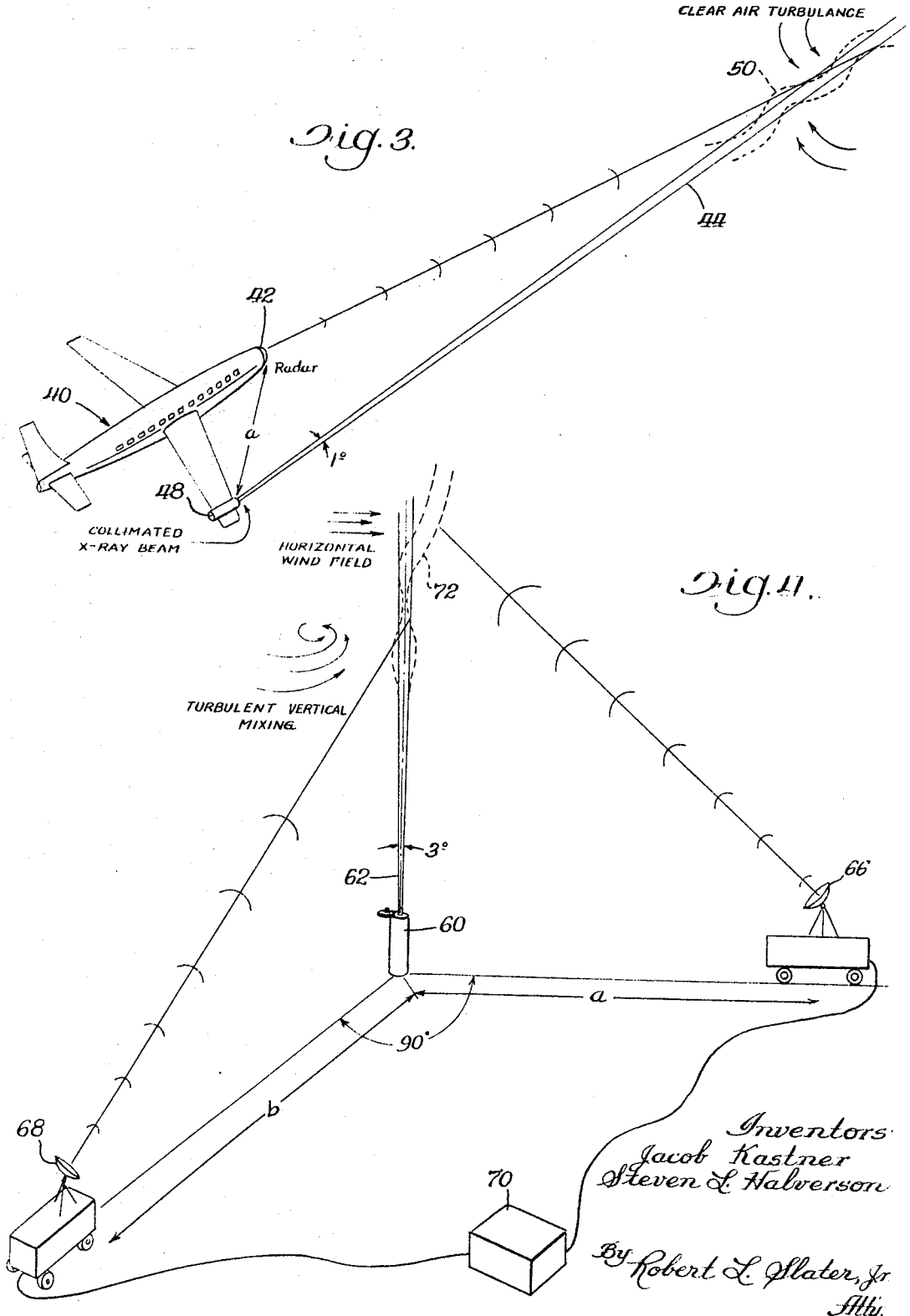

United States Patent Office 3,448,613
Patented June 10, 1969

3,448,613
SYSTEM FOR TRACKING AIR CURRENTS
Jacob Kastner, 402 Stanton St., Park Forest, Ill. 60466, and Steven Halverson, 209 W. Elmwood Drive, Chicago Heights, Ill. 60411
Filed Sept. 16, 1966, Ser. No. 580,073
Int. Cl. G01w 1/00
U.S. Cl. 73—170                         13 Claims

ABSTRACT OF THE DISCLOSURE

A device for measuring atmospheric turbulence having a radiation emitting means which emits a beam of ionizing radiation into the atmosphere to ionize a column of air. A wave means detects signals reflected from the ionized column and determines the presence of air turbulence by displacements and distortions of the ionized air column.

---

The present invention relates to measurement of atmospheric motion, more particularly it relates to a method and apparatus for the remote detection of small scale atmospheric motions or turbulence and the measurement of wind velocity profiles in the atmosphere.

The normal atmosphere is ordinarily transparent for all practical purposes to radio frequency electromagnetic waves and visible light frequency band waves. Motion in the atmosphere can be detected only indirectly by observation of the wind forces on particulate material suspended in the air, on an anemometer, or by tracking visually or by radar the motion of a windborne balloon. Turbulent motion in the atmosphere is at present beyond the capabilities of any existing instruments to reliably detect and measure at a distance in the free atmosphere. Wind-sensing instruments mounted at spaced intervals on a vertical tower provide indirect observation of turbulent air flow, but such observations are limited to the height of the tower, and at present such observations are confined largely to meterological research purposes.

The introduction of particulate matter into the free atmosphere to impart a visible light or radar wave reflectively to the atmosphere has been used in atmospheric and aerodynamic research. For example, smoke may be released in a wind tunnel to observe the flow of otherwise transparent air streams. A rising column of smoke, when available, is often noted by weather observers as a useful cue to the extent of turbulence or gustiness of air flow near the earth's surface. During hours of darkness, or during adverse weather conditions, visibility is nullified or reduced critically by darkness, precipitation, fog, or low-lying cloudiness, and observations of turbulent atmospheric flow is accordingly limited.

Heretofore radar observation of atmospheric motion has been based upon tracking a radar target such as a metallized balloon or other balloon borne target. The balloon rising at a predictable rate is transported horizontally by the wind motion at each discrete altitude. The horizontal wind field may be readily deduced from the balloon's motions observed through a radar set, provided the balloon carries a radar target surface or by a theodolite when visibility permits. Such observations of a rising balloon target give little or no significant data as to the extent of turbulent flow of the wind field. However, severe turbulence has been detected by observing the variable rate of vertical motion of a free balloon.

Efforts to impart reflectively per se for visible light or radio frequency waves to the free atmosphere have heretofore not been successful.

An early method for observing atmospheric motions disclosed by one of the co-inventors described in U.S. Patent 3,182,499, A method for Measuring Wind Velocity, utilizes an intense beam of coherent light rays which results in momentarily heating a column of air. The heated column of air may be detected by passive infra-red detection devices which when properly scanned will sense the position of successive segments of the heated air column. Horiontal or vertical turbulent mixing of the air in the vicinity of the heated air column will distort and displace successive segments of the heated column. By appropriate interpretation of the passive infra-red detector signals the extent of distortion which is induced in the column of air by turbulent atmospheric flow will be made observable. The aforesaid earlier passive method of observation of atmospheric turbulence has useful applications, but is limited in general use by the fact that the heated air in the column under observation tends to move at an accelerated rate upward even in a calm atmosphere and thus induce some eddy and turbulent motion. The passive infra-red detection means is limited in resolution and suffers in most practical applications from an unfavorable signal to noise ratio. The difference in temperature of the heated air being observed and the background is quite small. The efficiency of heating a column of air decreases with altitude. Hence, the coherent light beam and resultant infra-red observations hold little promise for the high altitude observations. The useful range of the passive infra-red detection system described above has so far proved to be too limited for any purpose other than meteorological research.

Jet aircraft frequently encounter hazardous turbulent flow of air at high altitudes. Clear air turbulence, referred to as CAT, has on numerous occasions damaged aircraft. Advanced warning to aircraft pilots of the presence of CAT along their routes is an urgent requirement. For instance, jet aircraft traveling at speeds from ten miles per minute and upward require instrumentation capable of detecting severe turbulence at least 25,000 feet and preferably further ahead of the aircraft in order that the pilot has sufficient warning to steer a new course and avoid the hazard. To meet this requirement for jet aircraft avoidance of CAT, monitoring of the atmosphere for turbulence by active high resolution means is required. No presently available means, including the above-described passive infra-red method fulfills that requirement.

Urban air pollution control authorities and those persons responsible for industrial operations or weapons testing have urgent requirements for a simple method to determine the ventilation rate of the atmosphere over cities, industrial facilities, and weapon testing sites.

Knowing the rate of vertical mixing in the atmosphere and hence the rate of dispersion and settling patterns of air pollutants, the density of atmospheric pollution can be regulated to remain below unsafe levels by appropriate scheduling of activities hazardous to the purity of the air. Presently available instruments for observing the atmospheric ventilation rate in a limited locality fall short of the needed sensitivity, range and general usefulness.

Accordingly, one object of the present invention is to provide an apparatus for remote observation of atmospheric motion and wind profiles.

Another object of the invention is to provide an all weather daylight and dark active system for observing turbulent motion in the atmosphere.

Still another object of the present invention is to provide a method of observing motion in the atmosphere without introducing any physical objects or contaminants into the atmosphere which remain after observations are completed.

Another object of the present invention is to provide a system for direct observation of atmospheric turbulence suitable for operation onboard aircraft.

Yet another object of the present invention is to provide an apparatus for observation of atmospheric turbulence at a remote location wherein the distance from which reliable observations may be made increases with altitude and increasing rarification of the atmosphere.

Another object of the present invention is to provide an atmospheric turbulence detection system at a reasonable and practical economic cost for general meteorological and jet aircraft applications.

These and other object and advantages will be apparent from the following specifications, drawings, and claims.

FIGURE 1 illustrates a first preferred embodiment of our invention.

FIGURE 2 is a partly cutaway view of one element of the combination shown in the embodiment of our invention illustrated in FIGURE 1.

FIGURE 3 is illustrative of a second preferred embodiment of our invention.

FIGURE 4 is a variation of the embodiment of our invention illustrated in FIGURE 1.

It has been shown by recent experiments that a highly collimated beam of ionizing radiation of sufficient power will ionize a column of the free atmosphere to a detectable amount for a substantial distance from the source. Depending upon various factors a column of atmosphere between 1000 and 10,000 meters in length can be ionized. At higher altitudes the effective range from the source of the ionization is greatly lengthened as compared to the range for the same powered source at sea level atmospheric pressure. The persistence of the atmospheric ionization ranges from milliseconds to one second; a detectable residue of ionized atmosphere persists for as long as ten or even one hundred seconds.

Radar signals are readily reflected from ionized atmosphere. When a radar signal of suitable strength is beamed toward an ionized column of air, a return signal showing the outline of the column may be obtained and displayed visually.

In view of the foregoing physical relationships, we conceived of a system for detecting atmospheric motion a preferred embodiment of which is illustrated in FIGURE 1. A source, shown at 10, of ionizing radiation which emits a highly columized beam of ionizing radiation is positioned at ground level and oriented to project the ionizing beam vertically. A beam of 3° of arc, we have found, yields satisfactory results; however, a narrower beam is to be preferred.

At a ground distance of $d$, a radar antenna 12 is positioned and views the ionized air column 14 throughout its vertical length. A convenient angle for observations with the antenna is obtained when the distance $d$ is 500 meters and the ionized column is 3000 meters in height. Disturbances or distortion in the structure of the ionized column caused by wind flow or turbulent mixing of the atmosphere may be readily detected by the radar echos when appropriately displayed on a radar viewing screen. The broken lines shown at 16 are representative of the distortion obtained in the ionized air column in the presence of a vertical wind shear.

Numerous radar systems are available which serve the present purpose satisfactorily. For instance, we found the AN/APS–4 and the AN/MPQ–33 yielded satisfactory results.

The ionizing radiation source 10 utilized in the embodiment of our invention illustrated in FIGURE 1 is shown in cutaway view in FIGURE 2. A spent nuclear reactor fuel rod 20 is positioned in the cylindrical well 26 of a heavily shielded container 24. A cap 30 is mounted to rotate across the aperture of the well 26. The cap 30 is provided with a small cylindrical aperture 32 which may be centered over the well 26. The ionizing beam may be "pulsed" by rotating the cap aperture 32 past the cylindrical well. We have found that satisfactory results are obtained either by generation of a continuous beam or by "pulsing" the beam and observing the resulting column.

FIGURE 3 illustrates a second embodiment of our invention. An aircraft 40 which is provided with a forward viewing radar antenna 42 at the tip of the fusilage views a horizontal or nearly horizontal column of ionized atmosphere.

An ionizing radiation source 48 is shown mounted on a wing tip and oriented to project the ionizing radiation beam forward of the plane. A high energy X-ray beam which is periodically pulsed by discharging a bank of capacitors carried within the plane and not shown in the drawings. The radar antenna 42 is shown as being positioned a distance $a$ from the source. The X-ray source lends itself to the propagation of a more finely collimated beam than is convenient with isotopes. A beam with 1° of arc yields a target readily observed from aboard the aircraft. Of course an X-ray source such as a reactor fuel rod, suitably shielded could be substituted for the X-ray source 48 shown in the drawing. However, in view of the weight requirements for shielding radio active isotopes of sufficient radio activity strength for the present purposes, the more readily controlled X-ray souce is preferred for aircraft applications. At altitudes above 20,000 feet, an ionizing ray can be projected 25,000 feet or more ahead of the plane.

On board an aircraft at high altitudes, clear air turbulence, which is comprised of high velocity turbulent flow, will distort the ionized beam a sufficient amount to be readily detected by the aircraft radar. Such distortion of the ionized column of air is shown in broken lines at 50. Thus a useful warning to the pilot of severe turbulence ahead of the aircraft can be obtained. Moreover, the warning of severe turbulence can be obtained at a distance sufficiently ahead of the aircraft to allow for maneuver to avoid the dangerous turbulent zone.

FIGURE 4 illustrates a variation on the embodiment of our invention shown in FIGURE 1. An ionizing radiation source 60 is positioned at ground level and oriented to project an ionizing column of radiation 62 vertically upward.

At a ground distance $a$ the first of two Doppler radar antenna 66 are positioned to view the ionized column throughout its length. A second antenna 68 is positioned at distance $b$ from the source 60.

The radar antennae 66 and 68 are connected by cables to a central radar receiver and radar return signal display facility, shown schematically at 70. With the Doppler system and by employing two antennae positioned at distances along 90° axes from the source, it is possible to obtain a three-dimensional view of the ionized column of air and to observe small transient distortions in the ionized air column such as moderate or light turbulence may cause. Distortions of the ionized air column are shown in broken lines at 72.

Of course, with suitable corrections, such system can be used at position angles other than 90°.

The preceding description of the components used in reducing our invention to practice is not intended to limit the scope of our invention as defined in the following claims.

We claim:

1. A device for measuring atmospheric wind from a remote point of observation comprising:
   radiation emitting means for emitting a beam of ionizing radiation into the atmosphere to ionize a column of air; and
   at a spaced distance from the radiation emitting means, a wave means adapted to observe by reflected waves, wind induced motions in the ionized air column.

2. The device of claim 1 wherein said radiation emitting means emits a beam having substantially three degrees of arc or less.

3. A device for measuring atmospheric turbulence comprising the combination of a radiation emitting means for emitting a beam of ionizing radiation into the atmosphere to ionize a volume of air, a radar means positioned at a distance from the radiation emitting means, the radar means being adapted to detect echo signals from the ionized column, whereby atmospheric turbulence is indicated by displacements and distortions of the ionized column reflecting the echo signals.

4. The device of claim 3, including means for moving said radiating emitting means and said radar means simultaneously toward the ionized volume of air.

5. The device of claim 3 wherein said radar means comprises:
- a first antenna means positioned at a first distance from said radiating emitting means;
- a second antenna means positioned at a second distance from the radiating emitting means whereby the intersecting angle formed by a first plane passing through the first antenna means and the radiating emitting means and a second plane passing through said antenna means and the radiating emitting means is substantially ninety degrees; and
- a central detector receiving means associated with said antenna to provide a substantially three-dimensional view of said ionized volume of air.

6. A device for measuring atmospheric turbulence comprising:
- a radiation emitting means for ionizing a column of air comprising a quantity of gamma ray emitting isotope positioned in the interior of an elongated cylindrical container, the container being made of high gamma ray cross-section material and being provided with an aperture in the end thereof, to the container for intermittently opening and closing the gamma rays being emitted through said aperture for ionizing a column of air; and
- a wave means positioned at a spaced distance from the radiation emitting means, the wave means being adapted to detect signals reflected from the ionized column, whereby atmospheric turbulence is indicated by displacements and distortions of said ionized column.

7. The device of claim 6 including means for controlling radiation emission.

8. The device of claim 7 wherein said means for controlling radiation emission comprises means for intermittently opening and closing the apertures of the container.

9. A device for measuring atmospheric turbulence comprising:
- a radiation emitting means for ionizing a column of air comprising a source of beamed X-rays, said beamed X-rays being emitted to ionize a column of air; and
- a wave means positioned at a spaced distance from the radiation emitting means, the wave means being adapted to receive reflected signals from the ionized column, whereby atmospheric turbulence is indicated by displacements and distortions of said ionized column.

10. The device of claim 9 including means for controlling the emission of the X-ray source.

11. The device of claim 10 wherein said means for controlling the emission of the X-ray source comprises means for intermittently pulsing the source of beamed X-rays.

12. A system for detecting the presence of and measuring the amplitude and intensity of atmospheric turbulence comprising a source of beamed ionizing radiation, a radio frequency electromagnetic wave signal generator, a signal receiver, an echo signal visual display means, and radio frequency antenna and switching means, the antenna being positioned a spaced distance from the ionizing radiation source, the radio frequency signal generator and echo signal receiver being alternately connected respectively to the antenna through the switching means, and the output of the echo signal receiver being connected to the visual display means, whereby, a column of air may be ionized by the beamed radiation, the ionized air column may be observed by the reflected radio waves as displayed on the visual display means, and the presence and amplitude of atmospheric turbulence will be indicated on the visual display means by the distortion of the column.

13. A method for detecting atmospheric turbulence comprising the steps of ionizing a column of air with a beam of ionizing radiation, irradiating the ionized air column with waves of a wavelength readily reflected by the ionized air, and detecting the reflected wave, whereby the displacement or distortion of the ionized column is a measure of instantaneous atmospheric turbulent motions impinging upon the ionized column.

References Cited

UNITED STATES PATENTS

| 2,703,843 | 3/1955 | Cameron | 313—230 X |
| 3,182,499 | 5/1965 | Moses | 73—189 |
| 3,212,085 | 10/1965 | Lhermitte et al. | |

OTHER REFERENCES

Fahnestock, J. D., The Electron Art. From Electronics, October 1950, p. 120.

RICHARD C. QUEISSER, *Primary Examiner.*

JERRY W. MYRACLE, *Assistant Examiner.*

U.S. Cl. X.R.

343—5

UNITED STATES PATENT OFFICE
CERTIFICATE OF CORRECTION

Patent No. 3,448,613                          June 10, 1969

Jacob Kastner et al.

It is certified that error appears in the above identified patent and that said Letters Patent are hereby corrected as shown below:

In the heading to the printed specification, lines 3 to 5, ", and Steven Halverson, 209 W. Elmwood Drive, Chicago Heights, Ill. 60411" should read -- ; Steven Halverson, 209 W. Elmwood Drive, Chicago Heights, Ill. 60411; Harry Moses, 297 Juniper St., Park Forest, Ill. 60466 and Leonidas D. Marinelli, 33 West 59th St., Westmont, Ill. 60559 --.

Signed and sealed this 21st day of April 1970.

(SEAL)
Attest:

Edward M. Fletcher, Jr.                       WILLIAM E. SCHUYLER, JR.
Attesting Officer                               Commissioner of Patents